US008286216B2

(12) United States Patent
Hagemeier

(10) Patent No.: US 8,286,216 B2
(45) Date of Patent: Oct. 9, 2012

(54) METHOD AND SYSTEM FOR TRANSMITTING DATA BETWEEN A CENTRAL RADIO STATION AND AT LEAST ONE TRANSMITTER

(75) Inventor: Denis Hagemeier, Berlin (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 328 days.

(21) Appl. No.: 12/331,771

(22) Filed: Dec. 10, 2008

(65) Prior Publication Data

US 2009/0158378 A1 Jun. 18, 2009

(30) Foreign Application Priority Data

Dec. 12, 2007 (DE) ........................ 10 2007 059 959

(51) Int. Cl.
*H04N 7/20* (2006.01)
*H04N 7/173* (2011.01)

(52) U.S. Cl. .............. 725/118; 725/67; 725/68; 725/71; 725/90

(58) Field of Classification Search .................. 370/338; 455/3.01, 351, 452.1; 725/67, 68, 71, 90
See application file for complete search history.

(56) References Cited

U.S. PATENT DOCUMENTS 5,216,503 A 6/1993 Paik et al.
5,506,844 A 4/1996 Rao
5,614,914 A 3/1997 Bolgiano et al.
5,903,574 A 5/1999 Lyons
6,005,605 A 12/1999 Kostreski et al.
6,088,337 A 7/2000 Eastmond et al.
6,130,898 A 10/2000 Kostreski et al.
6,192,070 B1 2/2001 Poon et al.
6,269,092 B1 7/2001 Schilling
6,313,885 B1 11/2001 Patel et al.
6,324,186 B1 11/2001 Mahn
6,414,720 B1 7/2002 Tsukidate et al.
6,477,180 B1 11/2002 Aggarwal et al.
6,480,236 B1 11/2002 Limberg
6,496,477 B1 12/2002 Perkins et al.
6,631,491 B1 10/2003 Shibutani et al.
6,640,239 B1 10/2003 Gidwani
6,721,337 B1 4/2004 Kroeger et al.
6,727,847 B2 4/2004 Rabinowitz et al.
(Continued)

FOREIGN PATENT DOCUMENTS

DE 196 17 293 A1 11/1997
(Continued)

OTHER PUBLICATIONS

ATSC Digital Television Standard (A/53) Revision E, Advanced Television Systems Committee, Dec. 27, 2005.

(Continued)

*Primary Examiner* — Kieu Oanh T Bui
(74) *Attorney, Agent, or Firm* — Fitzpatrick, Cella, Harper & Scinto

(57) ABSTRACT

First data is transmitted between a central radio station and at least one transmitter, where the first data is in first data fields of data packets and useful data is in second data fields of the data packets. The first data fields in this context are pre-reserved by the central radio station for the transmission of second data between the transmitter(s) and the receivers.

22 Claims, 3 Drawing Sheets

U.S. PATENT DOCUMENTS

| | | | | |
|---|---|---|---|---|
| 6,728,467 | B2 | 4/2004 | Oshima | |
| 6,772,434 | B1 | 8/2004 | Godwin | |
| 6,801,499 | B1 | 10/2004 | Anandakumar et al. | |
| 6,804,223 | B2 | 10/2004 | Hoffmann et al. | |
| 6,816,204 | B2 | 11/2004 | Limberg | |
| 6,861,964 | B2 | 3/2005 | Breti et al. | |
| 6,862,707 | B2 | 3/2005 | Shin | |
| 6,879,720 | B2 | 4/2005 | Sarachik et al. | |
| 6,930,983 | B2 | 8/2005 | Perkins et al. | |
| 6,996,133 | B2 | 2/2006 | Bretl et al. | |
| 7,110,048 | B2 | 9/2006 | Weiss | |
| 7,111,221 | B2 | 9/2006 | Birru et al. | |
| 7,197,685 | B2 | 3/2007 | Limberg | |
| 7,310,354 | B2 | 12/2007 | Fimoff et al. | |
| 7,324,545 | B2 | 1/2008 | Chuah et al. | |
| 7,336,646 | B2 | 2/2008 | Muller | |
| 7,349,675 | B2 | 3/2008 | Karr et al. | |
| 7,382,838 | B2 | 6/2008 | Peting | |
| 7,496,094 | B2 * | 2/2009 | Gopinath et al. | 370/389 |
| 7,532,677 | B2 | 5/2009 | Simon | |
| 7,532,857 | B2 | 5/2009 | Simon | |
| 7,539,247 | B2 | 5/2009 | Choi et al. | |
| 7,551,675 | B2 | 6/2009 | Kroeger | |
| 7,558,279 | B2 | 7/2009 | Hwang et al. | |
| 7,564,905 | B2 | 7/2009 | Park et al. | |
| 7,593,474 | B2 | 9/2009 | Jeong et al. | |
| 7,599,348 | B2 | 10/2009 | Kang et al. | |
| 7,667,780 | B2 | 2/2010 | Weiss | |
| 7,702,337 | B2 * | 4/2010 | Vare et al. | 455/452.1 |
| 7,715,491 | B2 | 5/2010 | Yu et al. | |
| 7,733,819 | B2 | 6/2010 | Lee et al. | |
| 7,779,327 | B2 | 8/2010 | Lee et al. | |
| 7,783,316 | B1 * | 8/2010 | Mitchell | 455/521 |
| 7,801,181 | B2 | 9/2010 | Song et al. | |
| 7,804,909 | B2 | 9/2010 | Choi et al. | |
| 7,822,134 | B2 | 10/2010 | Kim et al. | |
| 7,830,974 | B2 | 11/2010 | Choi et al. | |
| 7,852,961 | B2 | 12/2010 | Chang et al. | |
| 7,856,590 | B2 | 12/2010 | Kim et al. | |
| 7,933,351 | B2 | 4/2011 | Kim et al. | |
| 7,953,160 | B2 | 5/2011 | Gordon et al. | |
| 8,009,662 | B2 | 8/2011 | Lee et al. | |
| 2001/0017849 | A1 | 8/2001 | Campanella et al. | |
| 2002/0085548 | A1 | 7/2002 | Ku et al. | |
| 2003/0099303 | A1 | 5/2003 | Birru et al. | |
| 2003/0206596 | A1 | 11/2003 | Carver et al. | |
| 2005/0013249 | A1 | 1/2005 | Kong et al. | |
| 2005/0074074 | A1 | 4/2005 | Limberg | |
| 2005/0084023 | A1 | 4/2005 | Bott et al. | |
| 2005/0147186 | A1 | 7/2005 | Funamoto et al. | |
| 2005/0207416 | A1 | 9/2005 | Rajkotia | |
| 2005/0238100 | A1 | 10/2005 | Hsiao et al. | |
| 2005/0249300 | A1 | 11/2005 | Jeong et al. | |
| 2005/0249301 | A1 | 11/2005 | Jeong et al. | |
| 2006/0050770 | A1 | 3/2006 | Wallace et al. | |
| 2006/0200852 | A1 | 9/2006 | Simon | |
| 2006/0200853 | A1 | 9/2006 | Simon | |
| 2006/0244865 | A1 | 11/2006 | Simon | |
| 2006/0245516 | A1 | 11/2006 | Simon | |
| 2007/0066272 | A1 | 3/2007 | Vassiliou et al. | |
| 2007/0143810 | A1 | 6/2007 | Yousef | |
| 2007/0174880 | A1 | 7/2007 | Fite et al. | |
| 2007/0189410 | A1 | 8/2007 | Zeng | |
| 2007/0230460 | A1 | 10/2007 | Jeong et al. | |
| 2008/0211969 | A1 | 9/2008 | Simon et al. | |
| 2008/0247442 | A1 | 10/2008 | Orlik et al. | |
| 2008/0254739 | A1 * | 10/2008 | Kidd et al. | 455/3.01 |
| 2008/0273698 | A1 | 11/2008 | Manders et al. | |
| 2009/0003432 | A1 | 1/2009 | Liu et al. | |
| 2009/0016435 | A1 | 1/2009 | Brandsma et al. | |
| 2009/0201997 | A1 | 8/2009 | Kim et al. | |
| 2009/0228764 | A1 | 9/2009 | Lee et al. | |
| 2009/0252266 | A1 | 10/2009 | Heinemann et al. | |
| 2009/0265751 | A1 | 10/2009 | Limberg | |
| 2010/0254449 | A1 | 10/2010 | Rusch-Ihwe | |

FOREIGN PATENT DOCUMENTS

| | | | |
|---|---|---|---|
| DE | 199 60 295 | | 6/2001 |
| DE | 101 12 773 | | 9/2002 |
| DE | 10 2006 015 393 | A1 | 10/2007 |
| DE | 10 2007 012 465 | | 5/2008 |
| EP | 0 837 609 | | 4/1998 |
| EP | 0 926 894 | | 6/1999 |
| EP | 1 079 631 | A1 | 2/2001 |
| EP | 1 670 150 | | 6/2006 |
| EP | 1 753 249 | | 2/2007 |
| EP | 1 950 962 | A1 | 7/2008 |
| EP | 1 965 389 | A2 | 9/2008 |
| GB | 2 399 719 | | 9/2004 |
| WO | WO-02/03728 | | 1/2002 |
| WO | WO-03/009590 | | 1/2003 |
| WO | WO-03/045064 | | 5/2003 |
| WO | WO 2004/062283 | | 7/2004 |
| WO | WO-2007/114653 | | 10/2004 |
| WO | WO-2006/046107 | | 5/2006 |
| WO | WO 2006/066617 | | 6/2006 |
| WO | WO-2006/084361 | | 8/2006 |
| WO | 2006/094050 | A2 | 9/2006 |
| WO | WO-2007/046672 | | 4/2007 |
| WO | WO-2008/042694 | | 4/2008 |
| WO | WO-2009/016175 | | 2/2009 |
| WO | WO-2010/000407 | | 1/2010 |

OTHER PUBLICATIONS

ATSC Recommended Practice: Design of Synchronized Multiple Transmitter Networks (A/111), Advanced Television Systems Committee, Sep. 3, 2004.

ATSC Standard: Synchronization Standard for Distributed Transmission (A/110), Advanced Television Systems Committee, Jul. 14, 2004.

ATSC Standard: Synchronization Standard for Distributed Transmission, Revision A (A/110A), Advanced Television Systems Committee, Jul. 19, 2005.

ATSC Standard: Synchronization Standard for Distributed Transmission, Revision B (A/110B), Advanced Television Systems Committee, Dec. 24, 2007.

ATSC Technology Group Report: DTV Signal Reception and Processing Considerations, Doc. T3-600r4, Advanced Television Systems Committee, Sep. 18, 2003.

Battisa, "Spectrally Efficient High Data Rate Waveforms for The UFO SATCOM Channel", Military Communications Conference, MILCOM 98, Proceedings, Oct. 18-21, 1998, pp. 134-139, IEEE vol. 1.

Citta, R., et al., "ATSC Transmission System: VSB Tutorial", Zenith Electronics Corporation, Symposium Handout, Montreuz Symposium, Jun. 12, 1997.

"Digital Video Broadcasting (DVB); DVB Mega-Frame for Single Frequency Network (SFN) Synchronization", European Broadcasting Union; eTSI TS 101 191 v1.4.1, Jun. 2004.

International Preliminary Report on Patentability, PCT/US2006/007265, Oct. 4, 2007.

International Preliminary Report on Patentability, PCT/EP2008/000837, Aug. 6, 2009.

International Preliminary Report on Patentability, PCT/US2006/020599, Nov. 30, 2007.

International Preliminary Report on Patentability, PCT/US2006/022300, Dec. 27, 2007.

International Search Report and Written Opinion of the International Searching Authority, PCT/EP2008/000837, Aug. 12, 2008.

International Search Report and Written Opinion of the International Searching Authority, PCT/US2006/007251, May 20, 2008.

International Search Report and Written Opinion of the International Searching Authority, PCT/US2006/007265, Sep. 4, 2007.

International Search Report and Written Opinion of the International Searching Authority, PCT/US2006/015317, May 14, 2008.

International Search Report and Written Opinion of the International Searching Authority, PCT/US2006/020599, Aug. 31, 2007.

International Search Report and Written Opinion of the International Searching Authority, PCT/US2006/022300, Mar. 29, 2007.

Lecture 4: Digital Television The DVB transport stream, obtained from http://www.abo.fi/~jbjorkqv/digitv/lect4.pdf (last visited May 4, 2006).
Lee, Y., et al., "ATSC Terrestrial Digital Television Broadcasting Using Single Frequency Networks", ETRI Journal, Apr. 2004, pp. 92-100, vol. 26, No. 2.
Owen, H., "Proposed Modifications to ATSC Digital Television Standard to Improve Performance in the Face of Dynamic Multipath for Both Fixed and Mobile Operation", Sarnoff Corporation, Apr. 2, 2001, Princeton, New Jersey.
Patel, C. B., et al., "Proposal to ATSC Subcommittee T3/59 to Provide 8-VSB With a Repetitive-PN1023 Signal for Rapidly and Reliably Initializing Tracking in an Adaptive Equalizer Despite Adverse Multipath Conditions", Apr. 12, 2001.
Proposal for Enhancement of ATSC RF Transmission System (Revision to A/53), submitted by Samsung, Draft ver. 1.0, Sep. 16, 2004.
Raghunandan, K., "Satellite Digital Audio Radio Service (SDARS) System Architecture and Receiver Review", IEEE, Oct. 27, 2005.
Vogel, W. J., et al., "Propagation Effects and Satellite Radio Design", Paper No. 1445, Maastricht Exhibition and Congress Centre (MECC), Aug. 17-24, 2002, Maastricht, the Netherlands.
Wang, "A New Implementation of Single Frequency Network Based on DMB-T", 2004 International Conference on Communications, Circuits and Systems (2004 ICCCAS), Jun. 27-29, 2004, pp. 246-249, vol. 1.
Wang, X., et al., "Transmitter Identification in Distributed Transmission Network and Its Applications in Position Location and a New Data Transmission Scheme", NAB Broadcast Engineering Conference, Apr. 16-21, 2005, pp. 511-520, Las Vegas, Nevada.
Whitaker, J. C., "Standard Handbook of Video and Television Engineering", Chapter 17.2 "ATSC DTV Received Systems", 2000, pp. 17-63 to 17-99.
ATSC Digital Television Standard (A/53), "Annex D: RF/Transmission Systems Characteristics", Sep. 16, 1995, pp. 46-60.
"European Broadcasting Union Union Europeenne de Radio-Television Digital Video Broadcasting (DVB); Specification for Service Information (SI) in DVB systems; ETS 300 468", ETSI Standards, Lis, Sophia Antipolis Cedex, France, vol. BC, Second Edition, Jan. 1, 1997, pp. 1-72.

* cited by examiner

METHOD AND SYSTEM FOR TRANSMITTING DATA BETWEEN A CENTRAL RADIO STATION AND AT LEAST ONE TRANSMITTER

BACKGROUND

1. Field

The invention relates to a method and system for transmitting data between a central radio station and at least one transmitter.

2. Related Art

Before modulation with a high-frequency carrier, transmission systems for digital radio pack the audio and/or video data to be transmitted in datastreams consisting of data packets arranged in rows, wherein Internet-Protocol-based data packets are used by preference.

Alongside the transmission of useful data of this kind between a central radio station and the receivers of the radio subscribers, operational data of various content must also very frequently be transmitted from the central radio station to the individual transmitters of the digital radio-transmission system.

With regard to the application of the invention, reference can be made, for example, to a television signal according to the ATSC standard, as known, for example, from WO2006/094050A2.

The additional transmission of operational data of this kind exclusively between the central radio station and the transmitters of the transmission network unnecessarily increases the required bandwidth of the transmission system.

BRIEF DESCRIPTION

Example aspects of the present invention provide methods and transmission systems for transmitting operational data between a central radio station and transmitters, in such a manner that does not unnecessarily increase the bandwidth required for the transmission of the audio and/or video data from the central radio station to the receivers of the radio subscribers.

According to one embodiment, the individual data packets of a datastream transmitted between a central radio station and individual receivers of the radio subscribers within a digital radio-transmission system include first data fields, which are reserved at the origin of the transmission of second data between the individual transmitters and the individual receivers. The individual data packets are used, before the transmission of the second data, for the transmission of first data between the central radio station and the individual transmitters and include second data fields, which are used for the transmission of useful data between the central radio station and the receivers of the radio subscribers.

Preferably, the digital radio system corresponds to the Advanced Television Systems Committee standard (ATSC standard) and generates data packets for the digital datastream with first data fields, which are reserved for data for channel equalization—so-called SRS training sequences, and second data fields, which contain "payload" data (or "useful data") with digital audio and/or video data.

The first data between the central radio station and individual transmitters are, on one hand, operational data for the targeted, active influence of the operation of the individual transmission devices by the central radio station (such as a software-update data, configuration data, data for remote diagnosis, data for remote servicing, data for remote inspection, control data for remote action, and the like); and, on the other hand, operational data of the operational information system between the central radio station and individual transmission devices.

The second data between the individual transmitters and the individual receivers are used for maintenance and optimization of the physical signal transmission between transmitters and receivers, for example, training data for channel estimation, synchronization data for the synchronization of the receivers with the transmitters or additional data for signal equalization.

The first data can be routed to every transmission device and can include, for example, a general operational message from the central radio station to all transmitters. Alternatively, the first data can be generated only for one transmitter or a sub-group of transmitter and can include, for example, data for remote diagnosis of one or more transmission devices which may be operating incorrectly.

To address the respective transmitters and to provide the correct supply of the individual transmitters with the respectively-associated first data, the first data fields are subdivided into an address part including the transmitter addresses of those transmitters to be supplied with first data and a data part with the respective first data generated for the individual, addressed transmitters.

The first data can be transmitted in every data packet of the digital datastream—for example, in the case of a continuous remote inspection of the individual transmitter devices—or only in every $n^{th}$ data packet of the digital datastream—for example, in the case of cyclical software updates, or only acyclically, as required—for example, in the case of a remote diagnosis for a defective transmitter device.

BRIEF DESCRIPTION OF THE DRAWINGS

The features and advantages of the example embodiments of the invention presented herein will become more apparent from the detailed description set forth below when taken in conjunction with following drawings.

DETAILED DESCRIPTION

Figure 1:
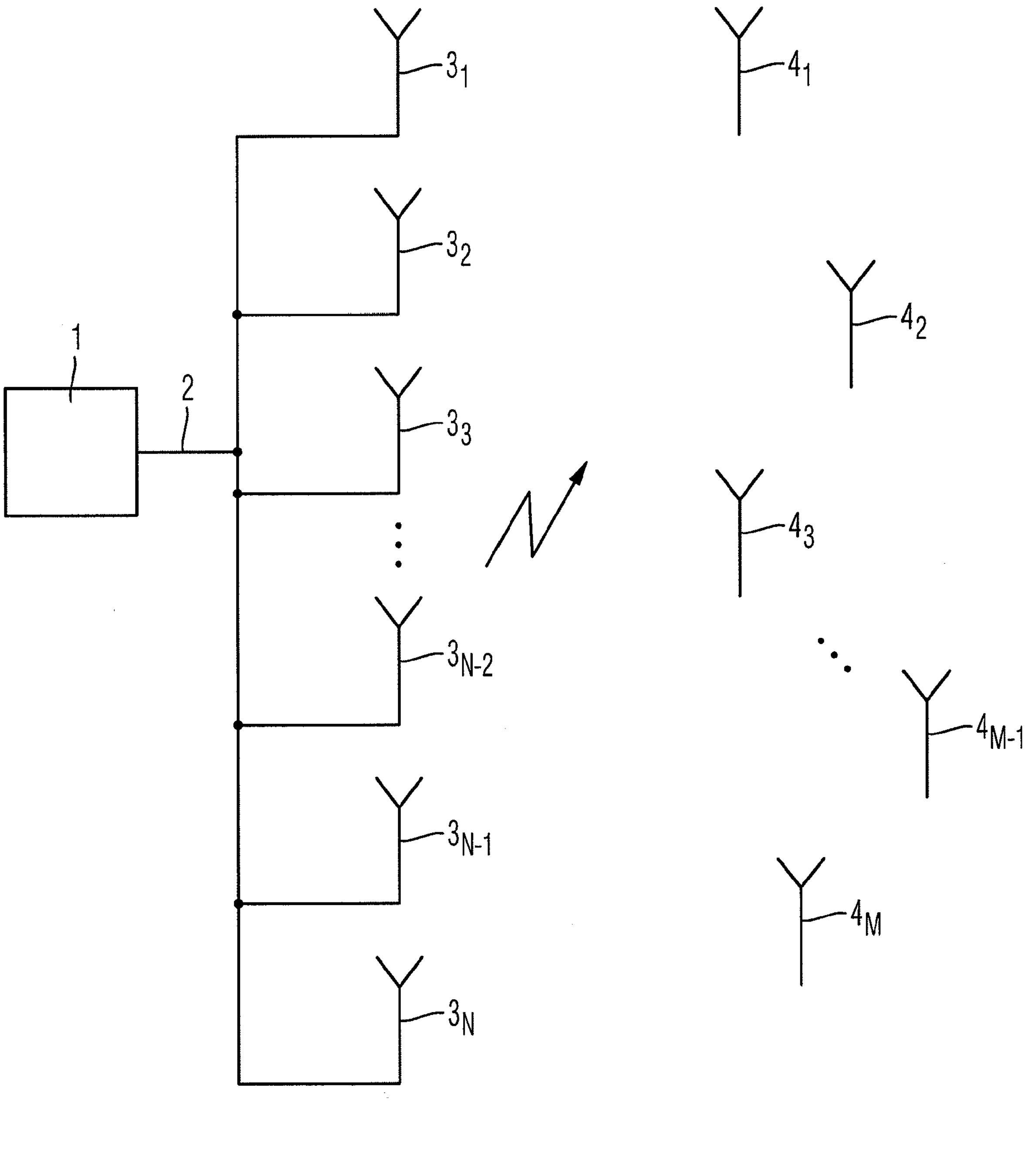
FIG. 1 shows a block-circuit diagram of the digital radio-transmission system.

Example embodiments of the invention presented herein are directed to a method and system for transmission of data between a central radio station and at least one transmitter using a data structure of the data packets within the digital datastream $TS_{OUT}$. FIG. 1 depicts the basic structure of a digital radio-transmission system and FIGS. 2 and 3 show example data structures of data packets in accordance with an embodiment of the present invention.

As shown in FIG. 1, in a central radio station 1, the individual audio and/or video data of several TV channels or TV programs are generated to form a common digital datastream $TS_{OUT}$ consisting of several data packets 5 arranged in rows. This digital datastream $TS_{OUT}$ is supplied to individual transmitters $\mathbf{3}_1, \mathbf{3}_2, \mathbf{3}_3, \ldots, \mathbf{3}_{N-2}, \mathbf{3}_{N-1}, \mathbf{3}_N$ via a transmission channel 2—for example, via signal lines. The baseband signal processing of the digital datastream $TS_{OUT}$—modulation, coding, interleaving and so on—and the conversion and amplification of the baseband signal to be transmitted into the high-frequency band are implemented in the individual transmitters $3_1, 3_2, 3_3, \ldots, 3_{N-2}, 3_{N-1}, 3_N$. The high-frequency transmission signal broadcast from the individual transmitters $3_1, 3_2, 3_3, \ldots, 3_{N-2}, 3_{N-1}, 3_N$ with the digital datastream $TS_{OUT}$ is received and further processed by receivers $4_1, 4_2, 4_3, \ldots, 4_{M-1}, 4_M$ of the radio subscribers.

Figure 2A:
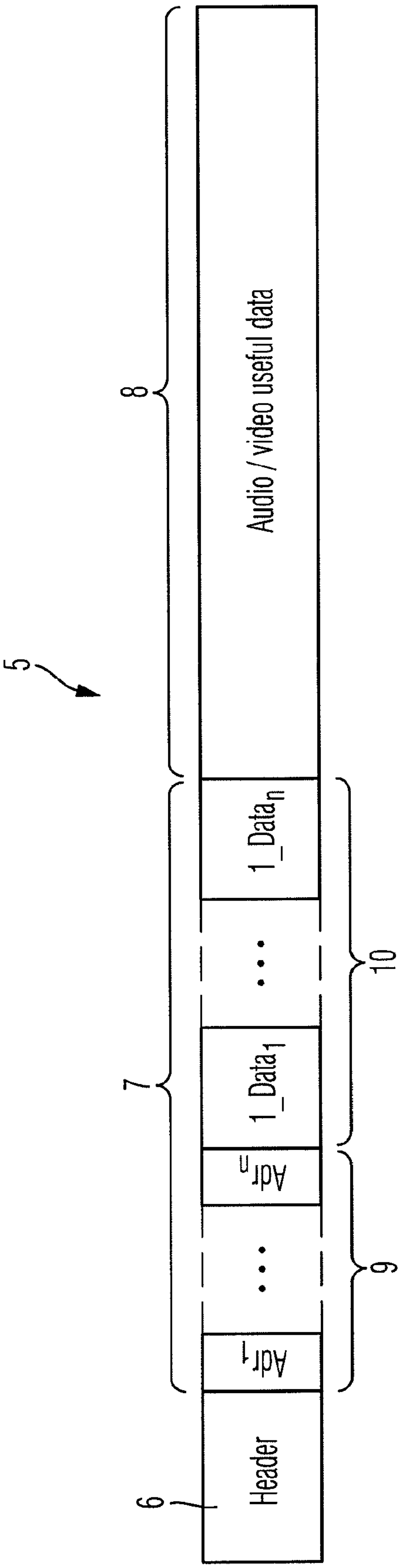
FIGS. 2A, 2B show a data structure of a data packet used in the digital datastream during the transmission from the central radio station to transmitters and during the transmission from transmitters to receivers, in accordance with an example embodiment of the present invention.
Figure 2B:
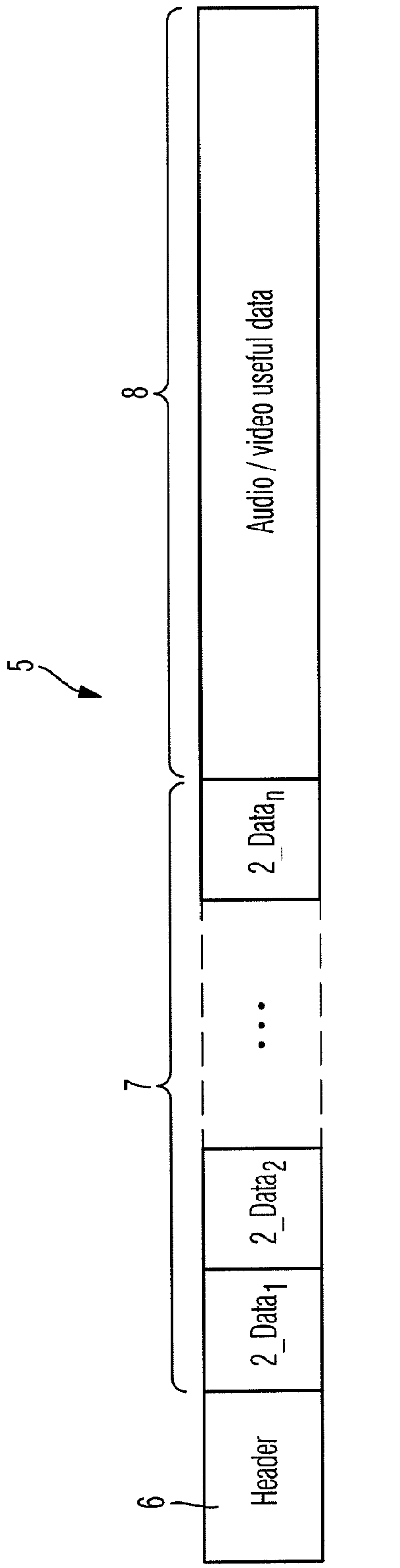
Figure 3:
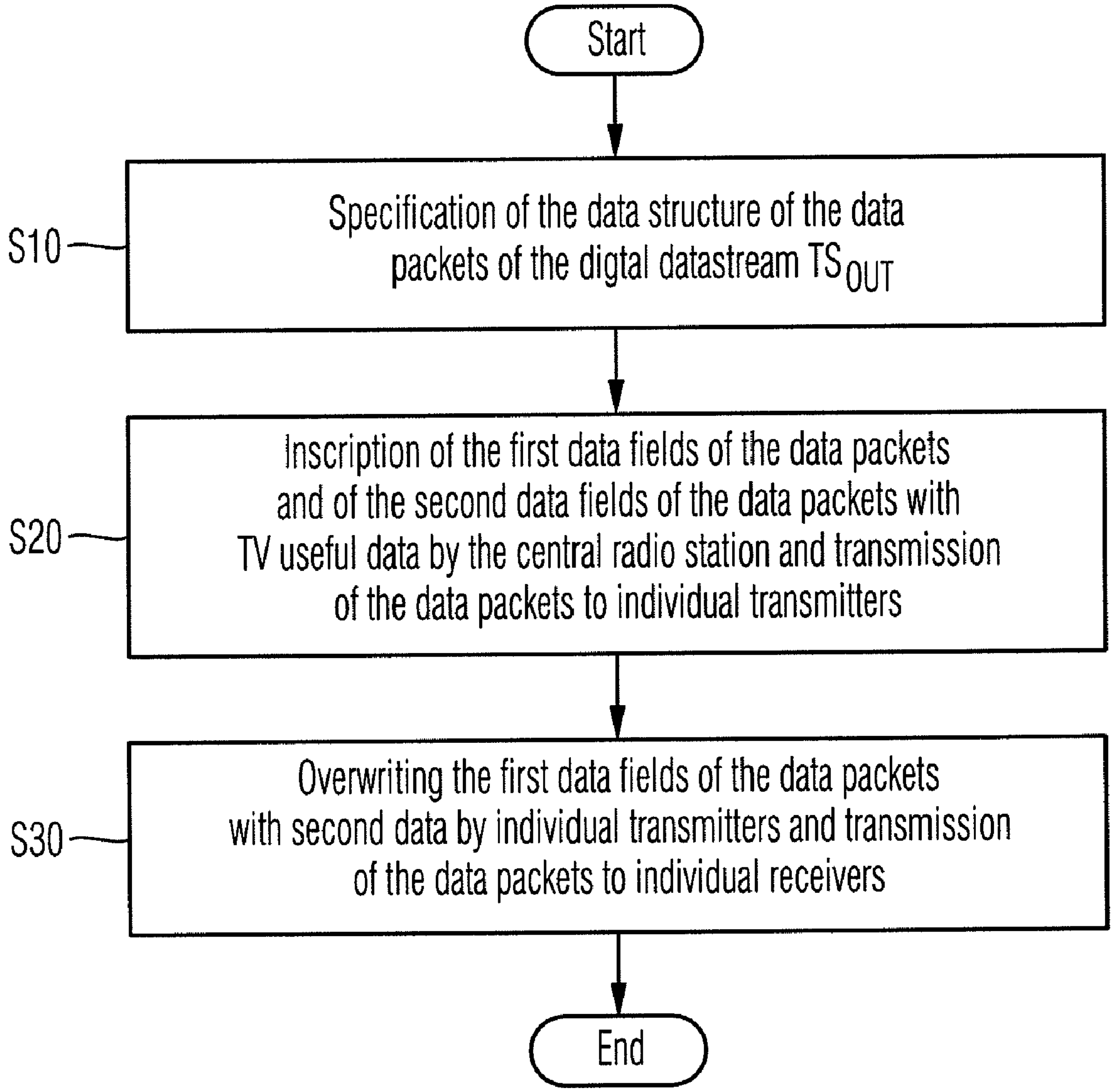
FIG. 3 shows a flowchart of a process for transmitting data between a central radio station and at least one transmitter in accordance with an example embodiment of the present invention.

Referring to FIGS. 2A and 2B, the data structure according to the invention of the data packets 5 used within the digital datastream $TS_{OUT}$ consists of a header 6, first data fields 7 and second data fields 8. Signatures and keys of the encodings, source and target addresses of the respective data packets, and classification and status data are typically stored in the header 6 of the data packet 5.

As shown in FIG. 2A, the first data fields 7 are reserved with regard to their data length for the transmission of second data $2\_Data_1, 2\_Data_2, \ldots, 2\_Data_n$ associated respectively with the individual transmitters $3_1, 3_2, 3_3, \ldots, 3_{N-2}, 3_{N-1}, 3_N$ (i.e., for transmission from the individual transmitters $3_1, 3_2, 3_3, \ldots, 3_{N-2}, 3_{N-1}, 3_N$ to the individual receivers $4_1, 4_2, 4_3, \ldots, 4_{M-1}, 4_M$ of the radio subscribers). The first data fields 7, contain, during the transmission from the central radio station 1 to the individual transmitters $3_1, 3_2, 3_3, \ldots, 3_{N-2}, 3_{N-1}, 3_N$, a data part 10 with up to n stored first data $1\_Data_1, 1\_Data_2, \ldots, 1\_Data_n$ and an address part 9 with up to n address fields $Adr_1$, $Adr_n$, in which, respectively up to n addresses each associated with the n transmitters $3_1, 3_2, 3_3, \ldots, 3_{N-2}, 3_{N-1}, 3_N$ for the addressing of the up to n first data $1\_Data_1, 1\_Data_2, \ldots, 1\_Data_n$ stored in the data part 10, are stored.

Accordingly, in the supply of every transmitter $3_1, 3_2, 3_3, \ldots, 3_{N-2}, 3_{N-1}, 3_N$ respectively with individual first data $1\_Data_1, 1\_Data_2, \ldots, 1\_Data_n$, n different first data $1\_Data_1, 1\_Data_2, \ldots, 1\_Data_n$ are stored in the data part 10, and respectively, a single address of that transmitter, which is supplied with the respective first data $1\_Data_1, 1\_Data_2, \ldots, 1\_Data_n$, is stored in every address field $Adr_1, Adr_2, \ldots, Adr_n$ of the address part 9. If all transmitters $3_1, 3_2, 3_3, \ldots, 3_{N-2}, 3_{N-1}, 3_N$ are supplied with identical first data $1\_Data_1, 1\_Data_2, \ldots, 1\_Data_n$, the data part 10 contains only one data record first data $1\_Data_1, 1\_Data_2, \ldots, 1\_Data_n$ and only the address field $Adr_1$ of the address part 9 relating to the first data $1\_Data_1$ with the addresses of all n transmitters $3_1, 3_2, 3_3, \ldots, 3_{N-2}, 3_{N-1}, 3_N$. If sub-groups of transmitters draw respectively identical first data, the data part 10 contains only a number of first data corresponding to the number of sub-groups of transmitters, and the address part 9 contains only a number of address fields corresponding to the number of sub-groups of transmitters with a number of transmitter addresses corresponding to the number of transmitters per sub-group of transmitters.

The first data between the central radio station and individual transmitters are, on one hand, operational data for the targeted, active influence of the operation of the individual transmitter devices by the central radio station—for example, software-update data, configuration data, data for remote diagnosis, data for remote servicing, data for remote inspection, control data for remote action, etc.—and, on the other hand, operational data of the operational information system between the central radio station and individual transmission devices.

In the case of software-update data, additional data classifying the update, such as the following classification data, are transmitted alongside the actual data for the software update of the individual transmitters $3_1, 3_2, 3_3, \ldots, 3_{N-2}, 3_{N-1}, 3_N$:

update version
length of the update software
update method
update time
software compatibility As shown in FIG. 2B, the first data fields 7 of every data packet 5 defined with first data $1\_Data_1, 1\_Data_2, \ldots, 1\_Data_n$, and addresses of the transmitters $3_1, 3_2, 3_3, \ldots, 3_{N-2}, 3_{N-1}, 3_N$, during the transmission from the central radio station 1 to the individual transmitters $3_1, 3_2, 3_3, \ldots, 3_{N-2}, 3_{N-1}, 3_N$, are inscribed by the individual transmitters $3_1, 3_2, 3_3, \ldots, 3_{N-2}, 3_{N-1}, 3_N$, with second data $2\_Data_1, 2\_Data_2, \ldots, 2\_Data_n$ associated respectively with the individual transmitters $3_1, 3_2, 3_3, \ldots, 3_{N-2}, 3_{N-1}, 3_N$. The second data $2\_Data_1, 2\_Data_2, \ldots, 2\_Data_n$, which are transmitted in the first data fields 7 of every data packet 5 from the individual transmitters $3_1, 3_2, 3_3, \ldots, 3_{N-2}, 3_{N-1}, 3_N$, to the individual receivers $4_1, 4_2, 4_3, \ldots, 4_{M-1}, 4_M$ of the radio subscribers, contain data for channel estimation, for synchronization of the receivers with the transmitters and for signal equalization, for example, SRS training sequences for channel estimation in the case of the ATSC standard.

Audio and/or video useful data of the digital radio, especially according to the Advanced Television Systems Committee standard, are stored in the second data field 8 of every data packet of the digital datastream $TS_{OUT}$.

The method according to the invention for the transmission of data between a central radio station 1 and at least one transmitter $3_1, 3_2, 3_3, \ldots, 3_{N-2}, 3_{N-1}, 3_N$, is described in the following section with reference to the flowchart in FIG. 3.

In step S10, the unique specification of the data structure for the individual data packets 5 of the digital datastream $TS_{OUT}$ is implemented by the central radio station 1. In this context, the length of the first data fields 7 for the transmission of the first data or respectively of the second data and the length of the second data fields 8 for the transmission of the audio and video data of the digital television (television signal) is specified in number of bytes. Furthermore, the structure of the first data fields 7 in the transmission of the data packets 5 from the central radio station 1 to the individual transmitters $3_1, 3_2, 3_3, \ldots, 3_{N-2}, 3_{N-1}, 3_N$,—number n of data records of the first data $1\_Data_1, 1\_Data_2, \ldots, 1\_Data_n$ in the data part 10 and corresponding number n of address fields $Adr_1, Adr_2, \ldots, Adr_n$ in the address part 9—and the structure of the first data fields 7 in the transmission of the data packets 5 from the individual transmitters $3_1, 3_2, 3_3, \ldots, 3_{N-2}, 3_{N-1}, 3_N$, to the individual receivers $4_1, 4_2, 4_3, \ldots, 4_{M-1}, 4_M$ of the radio subscribers—number n of data records of the second data $2\_Data_1, 2\_Data_2, 2\_Data_n$, is determined.

In the subsequent procedural stage S20, on the basis of the unique specification of the data structure of the individual data packets 5 of the digital datastream $TS_{OUT}$, the cyclical inscription of the first data fields 7 of the individual data packets 5 with the first data $1\_Data_1, 1\_Data_2, \ldots, 1\_Data_n$ or respectively transmitter addresses and of the second data fields of the individual data packets 5 with digital audio and video useful data of the digital television (television signal) and the cyclical transmission of the data packets 5 defined with data from the central radio station 1 to the individual transmitters $TS_{OUT}$ in operational running is implemented.

The transmission of the first data $1\_Data_1, 1\_Data_2, \ldots, 1\_Data_n$ in this context can be implemented in every data packet 5 of the digital datastream $TS_{OUT}$—for example, in the case of a continuous remote inspection of the individual transmitter devices—in every n-$^{th}$ data packet 5 of the digital datastream $TS_{OUT}$—for example, in the case of cyclical software updates—or acyclically, as required—for example, in the case of a remote diagnosis for a defective transmitter device.

In the final procedural stage S30, the first data fields 7 of the received data packets 5 from the individual transmitters $3_1$, $3_2$, $3_3$, . . . , $3_{N-2}$, $3_{N-1}$, $3_N$, are each overwritten with second data 2_Data$_1$, 2_Data$_2$, . . . , 2_Data$_n$, and routed to the individual receivers $4_1$, $4_2$, $4_3$, . . . , $4_{M-1}$, $4_M$ of the radio subscribers.

The invention is not restricted to the embodiment of the method and the system according to the invention for the transmission of data between a central radio station and at least one transmitter. In particular, the requirements of other, in particular, future digital television standards which implement data structures of data packets in digital datastreams, can be modified and/or used to carry data as described herein.

What is claimed is:

1. A method for transmission, comprising:

transmitting data packets between a central radio station and a plurality of receivers via at least one transmitter, the data packets having first data fields and second data fields, wherein the first data fields contain first data to be communicated between the central radio station and the at least one transmitter, wherein the first data include operational data assigned to the at least one transmitter to control each transmitter by the central radio station, wherein the second data fields contain useful data to be communicated between the central radio station and the plurality of receivers, and wherein, in the at least one transmitter, at least a portion of the first data in the first data fields is overwritten with second data to be communicated from the at least one transmitter to the plurality of receivers.

2. The method for transmission according to claim 1, wherein the useful data are video data and/or audio data of a digital television or radio signal according to the Advanced Television Systems Committee standard.

3. The method for transmission according to claim 1, wherein the first data between the central radio station and the at least one transmitter include operational data assigned to at least one targeted transmitter to control each targeted transmitter by the central radio station.

4. The method for transmission according to claim 1, wherein the first data between the central radio station and the at least one transmitter are operational data, for at least one targeted transmitter, to control each transmitter by the central radio station, the operational data being at least one: of software-update data, configuration data, data for remote diagnosis, data for remote servicing, data for remote inspection, and control data for remote action.

5. The method for transmission according to claim 1, wherein the first data between the central radio station and the at least one transmitter include operational data of an operational information system between the central radio station and the at least one transmitter.

6. The method for transmission according to claim 1, wherein the second data between the at least one transmitter and the plurality of receivers include data for channel estimation, for synchronization of the receivers with the at least one transmitter and for signal equalization.

7. The method for transmission according to claim 1, wherein the first data are transmitted for each transmitter.

8. The method for transmission according to claim 1, wherein either one of a given partial volume of the first data or an entire volume of the first data is determined respectively for one of the transmitters and displayed by addressing to the respective transmitter.

9. The method for transmission according to claim 1, wherein the first data are transmitted in every data-stream packet between the central radio station and the at least one transmitter.

10. The method for transmission according to claim 1, wherein the first data are transmitted in every $n^{th}$ data-stream packet between the central radio station and the at least one transmitter.

11. The method for transmission according to claim 1, wherein the first data are transmitted acyclically between the central radio station and the at least one transmitter.

12. A transmission system, comprising:

a central radio station transmission unit, in a central radio station, operable to transmit data packets between the central radio station and a plurality of receivers via at least one transmitter, the data packets having first data fields and second data fields, wherein the first data fields contain first data to be communicated between the central radio station and the at least one transmitter, wherein the first data include operational data assigned to the at least one transmitter to control each transmitter by the central radio station, wherein the second data fields contain useful data to be communicated between the central radio station and the plurality of receivers, and wherein, in the at least one transmitter, at least a portion of the first data in the first data fields is overwritten with second data to be communicated from the at least one transmitter to the plurality of receivers.

13. The transmission system according to claim 12, wherein the useful data are at least one of video and audio data of a digital television or radio signal according to the Advanced Television Systems Committee standard.

14. The transmission system according to claim 12, wherein the first data between the central radio station and the at least one transmitter include operational data assigned to at least one targeted transmitter to control each targeted transmitter by the central radio station.

15. The transmission system according to claim 12, wherein the first data between the central radio station and the at least one transmitter are operational data for the operation of individual transmitters by the central radio station, the operational data being at least one of: software-update data, configuration data, data for remote diagnosis, data for remote servicing, data for remote inspection, and control data for remote action.

16. The transmission system according to claim 12, wherein the first data between the central radio station and the at least one transmitter include operational data of an operational information system between the central radio station and the at least one transmitter.

17. The transmission system according to claim 12, wherein the second data between the transmitters and the receivers include data for channel estimation, for synchronization of the receivers with the transmitters and for signal equalization.

18. The transmission system according to claim 12, wherein the first data are transmitted for each transmitter.

19. The transmission system according to claim 12, wherein either one of a given partial volume of the first data or an entire volume of the first data is determined respectively for one of the transmitters and displayed by addressing to the respective transmitter.

20. The transmission system according to claim 12, wherein the first data are transmitted in every data-stream packet between the central radio station and the at least one transmitter.

21. The transmission system according to claim 12, wherein the first data are transmitted in every $n^{th}$ data-stream packet between the central radio station and the at least one transmitter.

22. The transmission system according to claim 12, wherein the first data are transmitted acyclically between the central radio station and the at least one transmitter.

* * * * *

UNITED STATES PATENT AND TRADEMARK OFFICE

CERTIFICATE OF CORRECTION

PATENT NO. : 8,286,216 B2
APPLICATION NO. : 12/331771
DATED : October 9, 2012
INVENTOR(S) : Denis Hagemeier It is certified that error appears in the above-identified patent and that said Letters Patent is hereby corrected as shown below:

On the Title Page

[30] FOREIGN APPLICATION PRIORITY DATA

"10 2007 059 959" should read --10 2007 059 959.7--.

[56] REFERENCES CITED

"WO-02/03728" should read --WO 2002/003728--.
"WO-03/009590" should read --WO 2003/009590--.
"WO-03/045064" should read --WO 2003/045064--.
"WO-2007/114653 10/2004" should read --WO 2007/114653 10/2007--.

In the Specification

COLUMN 2

Line 38, "following" should read --the following--.

COLUMN 3

Line 24, "7, contain," should read --7 contain,--.

In the Claims

COLUMN 5

Line 50, "one: of" should read --one of--.

Signed and Sealed this
Nineteenth Day of November, 2013

Teresa Stanek Rea
*Deputy Director of the United States Patent and Trademark Office*